United States Patent
Wagner et al.

(10) Patent No.: US 9,816,211 B2
(45) Date of Patent: *Nov. 14, 2017

(54) OPTIMIZED BRAID CONSTRUCTION

(71) Applicant: HONEYWELL INTERNATIONAL INC., Morristown, NJ (US)

(72) Inventors: Lori L. Wagner, Richmond, VA (US); Huy Xuan Nguyen, Midlothian, VA (US); Thomas Tam, Chesterfield, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 480 days.

This patent is subject to a terminal disclaimer.

(21) Appl. No.: 14/526,716

(22) Filed: Oct. 29, 2014

(65) Prior Publication Data

US 2016/0122919 A1    May 5, 2016

(51) Int. Cl.
*D04C 1/12* (2006.01)
*A01K 91/00* (2006.01)

(52) U.S. Cl.
CPC ............. *D04C 1/12* (2013.01); *A01K 91/00* (2013.01)

(58) Field of Classification Search
CPC ................................. D04C 1/12; A01K 91/00
See application file for complete search history.

(56) References Cited

U.S. PATENT DOCUMENTS

| | | |
|---|---|---|
| 3,979,106 A | 9/1976 | Jaques |
| 4,321,854 A * | 3/1982 | Foote .................... A01K 91/00 43/44.98 |
| 5,659,994 A | 8/1997 | Cutter et al. |
| 5,749,214 A | 5/1998 | Cook |
| 5,829,979 A * | 11/1998 | Kobashigawa .... A61C 13/0003 433/180 |
| 5,881,492 A | 3/1999 | Abiru et al. |
| 6,148,597 A | 11/2000 | Cook |
| 6,434,879 B1 | 8/2002 | Safwat et al. |
| 6,575,072 B2 | 6/2003 | Pellerin |
| 7,081,298 B2 | 7/2006 | Nakanishi |
| 7,235,285 B2 | 6/2007 | Nomura |
| 7,789,007 B2 | 9/2010 | Bosman |
| 7,823,496 B2 | 11/2010 | Bosman et al. |
| 8,022,171 B2 | 9/2011 | Goossens et al. |
| 8,181,438 B2 | 5/2012 | Cook et al. |
| 8,695,317 B2 | 4/2014 | Erlendsson et al. |
| 8,752,361 B2 | 6/2014 | Smeets et al. |
| 2004/0199208 A1 | 10/2004 | Foerster |
| 2004/0267313 A1* | 12/2004 | Amery ............ A61B 17/06166 606/228 |
| 2007/0135840 A1 | 6/2007 | Schmieding |
| 2008/0009903 A1* | 1/2008 | Schmieding ............ A61L 17/04 606/228 |
| 2008/0021501 A1 | 1/2008 | Schmieding |
| 2008/0022582 A1 | 1/2008 | Hamano et al. |
| 2008/0051834 A1* | 2/2008 | Mazzocca ............... A61L 17/04 606/222 |
| 2009/0158563 A1 | 6/2009 | Nakanishi |
| 2010/0098948 A1 | 4/2010 | Nakanishi |
| 2010/0192758 A1 | 8/2010 | Clough |
| 2010/0293833 A1 | 11/2010 | Bossone, III |
| 2011/0173873 A1 | 7/2011 | Nakanishi |
| 2011/0197564 A1 | 8/2011 | Zachariades |
| 2012/0021216 A1 | 1/2012 | Veillat et al. |
| 2012/0090289 A1* | 4/2012 | Cook .................... A01K 91/00 57/255 |
| 2012/0198808 A1 | 8/2012 | Bosman et al. |
| 2012/0259360 A1 | 10/2012 | Mazzocca et al. |
| 2012/0285074 A1 | 11/2012 | Yang |
| 2013/0205742 A1 | 8/2013 | Smeets et al. |
| 2013/0205979 A1 | 8/2013 | Nelis et al. |
| 2013/0247263 A1 | 9/2013 | Canedo Duarte Da Roch |
| 2014/0223799 A1 | 8/2014 | Bossone, III |
| 2016/0122918 A1* | 5/2016 | Tam ....................... A01K 91/00 87/8 |

OTHER PUBLICATIONS http://floridasportfishing.com/30lb-challenge/ (Sep. 15, 2010).*

* cited by examiner

*Primary Examiner* — Shaun R Hurley
(74) *Attorney, Agent, or Firm* — Roberts & Roberts, LLP; Richard S. Roberts, Jr.

(57) ABSTRACT

Braided bodies having a reduced braid density while retaining high tensile properties. High tenacity fibers are braided together at a braid density of less than or equal to 20 picks per inch, wherein the tenacity of the braided body does not decrease with increasing braid density from 17 picks per inch to 19 picks per inch in length of the braided body.

20 Claims, 2 Drawing Sheets

OPTIMIZED BRAID CONSTRUCTION

BACKGROUND

Technical Field

This technology relates to high tenacity braided fishing lines having reduced braid density and excellent breaking strength, and to processes for making the lines.

Description of the Related Art

It is known to use light weight, high strength fibers in fishing line and rope applications. Polyethylene fibers in particular, such as SPECTRA® extended chain polyethylene fibers and yarns from Honeywell International Inc. of Morristown, N.J., are excellent materials for the fabrication of these structures because they have very high strength to weight performance. Particularly, fibers formed from ultra high molecular weight polyethylene (UHMW PE) are known to possess excellent tensile properties such as tenacity, tensile modulus and energy-to-break at very low deniers. Such high tenacity fibers are typically made by a "gel spinning" process, also referred to as "solution spinning." In this type of process, a solution of ultra high molecular weight polyethylene and a solvent is formed, followed by extruding the solution through a multi-orifice spinneret to form solution filaments, cooling the solution filaments into gel filaments, and extracting the solvent to form dry filaments. These dry filaments are grouped into bundles which are referred to in the art as either "fibers" or "yarns." The fibers/yarns are then stretched, i.e. drawn, up to a maximum drawing capacity to increase their tenacity.

Fishing lines comprising multifilament gel spun polyethylene fibers are typically made by braiding together a plurality of fibers. These multi-fiber, multi-filament fishing lines have superior strength compared to braided or monofilament fishing lines formed from other polymers, such as polyesters or nylons, so they have a lower tendency to break during use. Due to their superior strength, braided fishing lines may be fabricated with lower line diameters relative to monofilament fishing lines having the same strength. This is significant, for example, because thinner lines allow anglers to cast longer and load more line onto their rod spools compared to monofilament lines. Braided fishing lines are also preferable because they are more durable than monofilament lines and thus will last longer without breaking down due to the sun or heavy use, and they have less of a tendency to coil and tangle than monofilament line. Furthermore, the braided, multi-fiber, multifilament construction is preferable to monofilament fishing lines because the monofilament line types have a tendency to stretch during use, whereas the braided lines do not stretch or have very little stretch. In this regard, non-stretching or low stretch lines are often preferred over greater stretch lines because they give anglers a better feel when they have a bite on their hook and they make it easier to set the hook after a bite.

Although existing braided fishing lines offer excellent performance, there is an ongoing need for products having improved properties and performance. In this regard, it has been observed that the tenacity of a braided body will inherently be lower than the tenacities of the component fibers because the fibers in the braided body are coiled into a helix and therefore are not fully straight, thereby inhibiting exploitation of the full tensile strength of fibers. Additionally, it has been observed in typical braid constructions that increasing braid tightness (braid density), i.e. increasing the number of overlaps or "picks" along the length of the braided body, will decrease the tenacity of the braided body. It has now been unexpectedly found that the tenacity of certain braided bodies will actually not decrease, i.e. the tenacity will either stay the same or actually increase, up to a certain number of picks-per-inch before reverting back to the expected pattern of decreasing tenacity with increasing braid density. These braided bodies are provided herein.

SUMMARY

Provided is a braided body comprising at least one ultrahigh molecular weight polyolefin fiber having a tenacity of at least 39 g/denier, wherein the braided body has a braid density of less than or equal to 20 picks per inch in length of the braided body, and wherein the tenacity of the braided body increases or remains the same with increasing braid density from 17 picks per inch to 19 picks per inch in length of the braided body.

Also provided is a method of making a braided body comprising the steps of:
a) providing a plurality of polymeric fibers;
b) optionally coating at least a portion of each polymeric fiber with either a thermoplastic resin or an oil;
c) optionally twisting or entangling the fibers; and
d) braiding the polymeric fibers together to form a braided body having a braid density of less than or equal to 20 picks per inch in length of the braided body; and
e) optionally stretching said braided body, wherein the braided body is optionally heated during and/or before stretching to a temperature below the melting point of the fibers; and
f) optionally fusing together the fibers forming the braided body,
wherein the braided body has a breaking strength of at least 83.0 lbs force and a diameter of less than 2 mm.

Also provided is braided body comprising a plurality of ultrahigh molecular weight polyolefin fibers, each having a tenacity of at least 39 g/denier, wherein said fibers are braided together and form the braided body, wherein the braided body has a braid density of greater than 15 picks per inch (PPI) but less than 20 PPI in length of the braided body, and wherein the braided body has a diameter of less than 2 mm.

DETAILED DESCRIPTION

Provided herein are braided bodies incorporating one or more ultra high molecular weight polyolefin fibers that are particularly suitable for use as fishing lines, though they may be used for any purpose, such as sash cords, water ski ropes, mountaineering ropes, yachting ropes, parachute lines, fishing nets, mooring lines, hawsers, shoe laces, medical applications such as catheters or dental floss, high-pressure tubes, ground cables and harnesses. As used herein, the braided bodies are elongate structures having a length dimension that is much greater than the transverse dimensions of width and thickness. As used herein, the term "fishing line" is not intended to be limiting and only indicates a potential use of the braided bodies.

Figure 1:
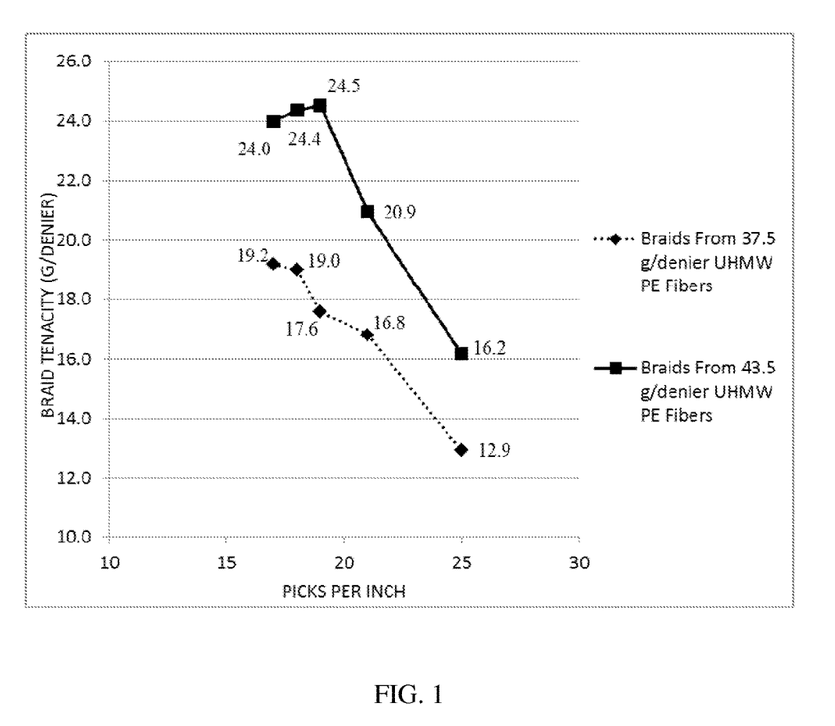
FIG. 1 illustrates a graphical representation of the tenacity of braided bodies, formed exclusively with ultra high molecular weight polyethylene multifilament fibers having tenacities of 43.5 g/denier, at braid densities of 17, 18, 19, 21 and 25 picks per inch.

FIG. 1 illustrates braided bodies provided herein that exhibit the unexpected phenomenon of maintained or increased braid tenacity despite increasing the braid tightness, also referred to as braid density. In this regard, the point at which the fibers forming the braid cross over one another is called a "pick" and braid density is measured in "picks per inch" ("PPI"). The distance between each pick is referred to in the art as the "pitch" of the braid. The braid density/tightness may be adjusted as desired using the selected braiding equipment to increase or decrease the number of picks along the length of the braid. The data presented graphically in FIG. 1 specifically compares the tenacity of two different UHMW PE braid types at various braid density levels wherein the braided bodies were not stretched after braiding and where the fibers forming the braided bodies were unfused. The bottom line in the figure shows the braid tenacities of four braided body samples, each braided body sample being formed with four ultra high molecular weight polyethylene fibers, each of the four fibers having a denier of 375 and a tenacity of 37.5 g/denier. The top line in the figure shows the braid tenacities of four additional braided body samples, each additional braided body sample being formed with four ultra high molecular weight polyethylene fibers, each of the four fibers having a denier of 375 and a tenacity of 43.5 g/denier. As illustrated, the 37.5 g/denier braided bodies exhibited the expected decrease in braid tenacity with increased braid density (19.2 g/denier at 17 PPI, 19.0 g/denier at 18 PPI, 17.6 g/denier at 19 PPI, 26.8 g/denier at 21 PPI and 12.9 g/denier at 25 PPI). However, the 43.5 g/denier braided bodies unexpectedly increased in tenacity from 17-19 PPI (24.0 g/denier at 17 PPI, 24.4 g/denier at 18 PPI, and 24.5 g/denier at 19 PPI) before reverting to the norm at 21 PPI (20.9 g/denier) and 25 PPI (16.2 g/denier). As a result, the braided bodies provided herein take advantage of the benefits of high braid density without sacrificing tenacity. This imparts more monofilament-like characteristics and performance to the braided body. For fishing lines particularly, such benefits include improved casting-ability, reduced casting noise and higher durability. To achieve this unexpected result, the braided bodies should have a braid density of less than or equal to 20 picks per inch in length of the braided body. In the preferred embodiments, the braided body has a density of less than or equal to 20 PPI, more preferably from about 0.5 PPI to 20 PPI, more preferably from about 14 PPI to 20 PPI, still more preferably less than 20 PPI, still more preferably from about 15 PPI to 20 PPI, still more preferably from about 15 PPI to 19 PPI and most preferably from 17 PPI to 19 PPI in length of the braided body. Each of these ranges are specific to the braid density/tightness of unstretched braided bodies, i.e. the braided bodies after braiding but before any optional additional stretching of the braided bodies.

As used herein, a "fiber" is a long strand of a material, such as a strand of a polymeric material, the length dimension of which is much greater than the transverse dimensions of width and thickness. The fiber is preferably a long, continuous strand rather than a short segment of a strand referred to in the art as a "staple" or "staple fiber." A "strand" by its ordinary definition is a single, thin length of something, such as a thread or fiber. The cross-sections of fibers for use herein may vary widely, and they may be circular, flat or oblong in cross-section. They also may be of irregular or regular multi-lobal cross-section having one or more regular or irregular lobes projecting from the linear or longitudinal axis of the filament. Thus the term "fiber" includes filaments, ribbons, strips and the like having regular or irregular cross-section. It is preferred that the fibers have a substantially circular cross-section. A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. Multifilament fibers as defined herein preferably include from 2 to about 3000 filaments, more preferably from 2 to 1000 filaments, still more preferably from 30 to 500 filaments, still more preferably from 40 to 500 filaments, still more preferably from about 40 filaments to about 240 filaments and most preferably from about 120 to about 240 filaments. Multifilament fibers are also often referred to in the art as fiber bundles or a bundle of filaments. As used herein, the term "yarn" is defined as a single strand consisting of multiple filaments and is used interchangeably with "multifilament fiber." The term "tenacity" refers to the tensile stress expressed as force (grams) per unit linear density (denier) of an unstressed specimen. The term "tensile modulus" refers to the ratio of the change in tenacity, expressed in grams-force per denier (g/d) to the change in strain, expressed as a fraction of the original fiber/tape length (in/in).

The braided body comprises, consists essentially of or consists of a plurality of fibers that are braided together to form the braided body. All fibers useful herein for forming the braided bodies are preferably polymeric fibers, most preferably thermoplastic polymer fibers formed from one or more thermoplastic polymers. In the most preferred embodiments, at least one of said fibers forming the braided body comprises an ultrahigh molecular weight polyolefin fiber having a tenacity of at least 39 g/denier. Said fibers preferably have a tenacity of from about 39 g/denier to about 70 g/denier, or at least 40 g/denier. The most preferred polyolefin fibers are polyethylene fibers, most preferably gel spun (solution spun) ultra high molecular weight polyethylene fibers having a tenacity of at least 39 g/denier. More preferably, the polyethylene fibers have a tenacity of from about 43 g/denier to about 70 g/denier, still more preferably have a tenacity of 43 g/denier or more, or at least 43.5 g/denier, still more preferably from about 45 g/denier to about 70 g/denier, still more preferably have a tenacity of at least 45 g/denier, at least about 48 g/denier, at least about 50 g/denier, at least about 55 g/denier or at least about 60 g/denier. Additionally, polyethylene fibers useful for forming the braided body can have a tensile modulus greater than about 1400 g/d, including up to about 2000 g/d, or greater than about 2000 g/d. While the braided body only need include one of such high strength polyolefin fibers, it is most preferred that all the fibers forming the braided body are polyolefin fibers possessing these properties. Most preferably, all of the fibers forming the braided body comprise, consist essentially of or consist of multifilament ultrahigh molecular weight polyethylene fibers, each having a tenacity of at least 39 g/denier, more preferably multifilament, ultra high molecular weight polyethylene fibers each of which has a tenacity of at least 43 g/denier, and most preferably, multifilament, ultra high molecular weight polyethylene fibers each of which has a tenacity of at least 45 g/denier, each preferably also possessing the other properties identified above, including a tensile modulus of at least about 1400 g/d.

Ultra high molecular weight polyolefin (UHMW PO) or UHMW PE polyethylene fibers useful herein for forming the braided bodies may be fabricated from any process that is capable of producing UHMW PE fibers having tenacities of at least 39 g/denier, most preferably where the fibers are multi-filament fibers. The most preferred processes include those described in U.S. Pat. Nos. 7,846,363; 8,361,366; 8,444,898; 8,747,715; as well as U.S. publication no. 2011-0269359, the disclosures of which are incorporated by reference herein to the extent consistent herewith.

As described in U.S. Pat. No. 8,444,898, a process is provided wherein a polyethylene solution is formed by processing an UHMW PO/solvent slurry under specialized conditions to convert it into a homogeneous solution of UHMW PO dissolved in the solvent. The thus formed solution is then passed through a shaping orifice to form a molded solution article, which is then stretched and cooled to obtain a molded gel article. The molded gel article is then stretched, followed by removing the solvent from the molded gel article to form a solid fiber, with additional stretching of the fiber being performed to increase the tenacity of the fiber.

As described in U.S. Pat. No. 8,747,715 and related U.S. publication no. 2011-0269359, a process for producing gel spun yarns made from ultra high molecular weight polyethylene is provided, the process comprising the steps of: feeding a slurry that comprises an UHMW PE and a spinning solvent to an extruder to produce a liquid mixture, the UHMW PE having an intrinsic viscosity in decalin at 135° C. of at least about 30 dl/g; passing the liquid mixture through a heated vessel to form a homogeneous solution comprising the UHMW PE and the spinning solvent; providing the solution from the heated vessel to a spinneret to form a solution yarn; drawing the solution yarn that issues from the spinneret at a draw ratio of from about 1.1:1 to about 30:1 to form a drawn solution yarn; cooling the drawn solution yarn to a temperature below the gel point of the UHMW PE polymer to form a gel yarn; drawing the gel yarn in one or more stages at a first draw ratio DR1 of from about 1.1:1 to about 30:1; drawing the gel yarn at a second draw ratio DR2; removing spinning solvent from the gel yarn in a solvent removal device to form a dry yarn; drawing the dry yarn at a third draw ratio DR3 in at least one stage to form a partially oriented yarn; transferring the partially oriented yarn to a post drawing operation; and drawing the partially oriented yarn at a post drawing temperature in the post drawing operation to a fourth draw ratio DR4 of from about 1.8:1 to about 15:1 to form a highly oriented yarn product having a tenacity of greater than about 45 g/d (40.5 g/dtex) and a modulus of greater than about 1400 g/d. As explained in this patent, the drawing conditions in each drawing step are carefully controlled, with the final drawing step being conducted in one extremely long oven or in a series of ovens, each of which is a forced hot air convection oven, as compared to in a nitrogen blanketed oven having no forced air flow. This is because the lack of forced air flow will establish a laminar flow regime with temperature differences will exist from exterior to interior filaments (in a multi-filament fiber bundle that is being stretched), with the consequence of non-uniform drawing across the bundle and limited maximum draw capability. The convection oven provides a turbulent gas flow that agitates the fiber bundle, minimizing temperature differences and permitting more uniform and higher drawing.

Methods of forming polyolefin fibers having tenacities of 39 g/denier or more are also described in U.S. Pat. No. 7,846,363 and related U.S. Pat. No. 8,361,366. U.S. Pat. No. 7,846,363 describes a process for the production of a multi-filament poly(alpha-olefin) yarn comprising the steps of: a) forming a solution of a poly(alpha-olefin) in a solvent at an elevated temperature, said poly(alpha-olefin) having an intrinsic viscosity when measured in decalin at 135° C. of from about 5 to about 45 dl/g; b) passing said solution through a multi-filament spinneret to form a solution yarn, said spinneret being at an elevated temperature; c) drawing said solution yarn at a draw ratio of from about 1.1:1 to about 30:1; d) rapidly cooling said solution yarn to a temperature below the gel point of said solution, to form a gel yarn; e) drawing said gel yarn in at least one stage to a first draw ratio DR1; f) removing solvents from said get yarn while drawing at a second draw ratio DR2 in at least one stage to form an essentially dry yarn containing less than about 10 weight percent of solvents; g) drawing said dry yarn to a third draw ratio DR3 of from about 1.10:1 to about 2.00:1 in at least one stage to form a partially oriented yarn; h) optionally relaxing said partially oriented yarn from about 0.5 to about 5% of its length; i) winding up said partially oriented yarn; j) unrolling said partially oriented yarn and drawing it in at least one stage at a temperature of from 130° C. to 160° C. to a fourth draw ratio DR4 of from about 1.8:1 to about 10:1 to form a highly oriented yarn having a tenacity of from about 38 to about 70 g/d (34.2 to 63 g/dtex) as measured by ASTM D2256-02 at 10 inch (25.4 cm) gauge length and a strain rate of 100%/min; k) cooling said highly oriented yarn under tension and winding it up; wherein the product of the draw ratios DR1×DR2×DR3 is greater than or equal to about 5:1, wherein the fractional off-line draw of the dry yarn (FOLDY), defined by the relationship, is from about 0.75 to about 0.95, and wherein steps a) through i) are conducted continuously in sequence and are discontinuous with continuous sequential steps j) to k). Related U.S. Pat. No. 8,361,366 provides a similar process wherein the FOLDY limitation is not required but wherein the partially oriented yarn is produced at a rate of at least about 0.35 g/min per filament of said partially oriented yarn.

To manufacture high tenacity polyolefin fibers, the polyolefin polymer raw material must have a high molecular weight and a high intrinsic viscosity. High molecular weight, high IV polymers will yield high IV fibers having high tenacity. Ultra high molecular weight polyethylene filaments, fibers and yarns in particular are formed from extended chain polyethylenes having molecular weights of at least 300,000, preferably at least one million and more preferably between two million and five million. The most preferred UHMW PE fibers have an intrinsic viscosity when measured in decalin at 135° C. by ASTM D1601-99 of greater than about 19 dl/g to about 40 dl/g, preferably at least about 20 dl/g to about 40 dl/g, more preferably from about 22 dl/g to about 40 dl/g, and most preferably from about 25 dl/g to 40 dl/g. Processing of the fibers will reduce the intrinsic viscosity of the polymer to a degree, so the UHMW PE raw material must have a greater IV than the final product. As described in U.S. Pat. No. 8,747,715, the UHME PE that is selected for use in the gel spinning process can have an intrinsic viscosity in decalin at 135 ° C. of at least about 30 dl/g, or greater than about 30 dl/g, including being from about 30 dl/g to about 100 dl/g, or greater than about 100 dl/g. In some examples, the UHMW PE can have an intrinsic viscosity in decalin at 135 ° C. of about 30 dl/g, about 35 dl/g, about 40 dl/g, about 45 dl/g, about 50 dl/g, about 55 dl/g, about 60 dl/g, about 65 dl/g, about 80 dl/g, about 85 dl/g, about 90 dl/g, about 95 dl/g, or about 100 dl/g. The preferred UHMW PE polymer IV ranges from about 30 dl/g to about 50 dl/g. Further, in at least some examples, highly oriented UHMW PE fibers useful herein have an intrinsic viscosity that is from about 0.2 times the intrinsic viscosity of the UHMW PE polymer from which the fiber was made to about 0.65 times the intrinsic viscosity of the UHMW PE polymer from which the fiber was made.

The most preferred UHMW PE fibers also are highly oriented and have a c-axis orientation function of at least about 0.96, preferably at least about 0.97, more preferably at least about 0.98 and most preferably at least about 0.99. The c-axis orientation function is a description of the degree of alignment of the molecular chain direction with the filament direction. A polyethylene filament in which the molecular chain direction is perfectly aligned with the filament axis would have an orientation function of 1. C-axis orientation function ($f_c$) is measured by the wide angle x-ray diffraction method described in Correale, S. T. & Murthy, Journal of Applied Polymer Science, Vol. 101, 447-454 (2006) as applied to polyethylene.

Ultra high molecular weight polyolefin fibers having a tenacity of at least 39 g/denier, particularly those fabricated according to the methods described in U.S. Pat. Nos. 7,846,363; 8,361,366; 8,444,898; 8,747,715; and U.S. publication no. 2011-0269359 have been unexpectedly found to produce fibers having reduced thermal shrinkage at elevated temperatures relative to fibers having tenacities below 39 g/denier, such as 37.5 g/denier, particularly those produced by other processes. As a result of the reduced fiber thermal shrinkage, the thermal shrinkage of the braided bodies formed from these fibers is correspondingly reduced, resulting in fishing lines having unexpectedly improved durability and resistance to degradation due to heat and sunlight.

As used herein, "thermal shrinkage" refers to shrinkage observed due to increased temperatures, and it may be measured in terms of the percent decrease in length that is observed under a given temperature. Thermal shrinkage of the braided body is determined herein by the ASTM D4974 "Hot Air Thermal Shrinkage of Yarn and Cord Using a Thermal Shrinkage Oven" method. This method measures thermal shrinkage at 177° C. and accordingly is intended for use with fibers/yarns made from nylon, polyester, and other polymers not detrimentally affected by that temperature. The method may be used with other polymer types at other temperatures, and for the polyethylene fibers used herein which melt at a temperature ranging from about 150° C.-155° C., testing was performed at 145° C. In accordance with the present disclosure, the braided bodies preferably have a thermal shrinkage property in 2 minutes at 145° C. as determined by ASTM D4974-99 of 3.0% or less, more preferably less than 3.0%, still more preferably 2.5% or less, still more preferably less than 2.5%, still more preferably 2.3% or less, still more preferably less than 2.3%, still more preferably 2.15% or less, still more preferably less than 2.15%, still more preferably 2.0% or less, and most preferably less than 2.0%. The thermal shrinkage amount of the most preferred braided bodies, where the fibers forming the braided body are exclusively UHMW PE fibers, in 2 minutes at 145° C. can be expressed by the equation 0.2242(PPI)− 2.209+b, wherein PPI is greater than 15 but less than 20, and wherein b is greater than −0.1.

These most preferred UHMW PE fibers have also been found to achieve braided bodies having a low creep tendency. As is conventionally known, "creep" is the long-term, longitudinal deformation of a material over time when subjected to a continuing load. The creep tendency of an elongate body, such as a fiber, yarn or braided body may be determined, for example, by subjecting a sample to a selected sustained load (e.g. 10% of the breaking strength of the test specimen) over a selected time (e.g. 300 minutes for short term creep, or 10,000 minutes for long term creep) at a selected temperature (e.g. room temperature, such as 70-72° F., or heated to 70° C.) whereby the elongation of the sample is measured after the selected time expires. In this method, the creep percentage may be calculated according to the following equation that is outlined in U.S. Pat. No. 5,578,374, the disclosure of which is incorporated by reference herein to the extent consistent herewith:

$$\% \text{ creep} = 100 \times [A(s,t) - A(o)]/A(o)$$

where A(o) is the length of the test section immediately prior to application of load, s; and where A(s,t) is the length of the test section at time t after application of load, s.

As used herein, a "low creep" braided body preferably exhibits about 3.0% or less elongation, more preferably about 2.0% or less elongation, still more preferably about 1.5% or less elongation, still more preferably about 1.0% or less elongation and most preferably about 0.5% or less elongation when the braided body is subjected to a stress equal to 10% of the breaking strength of the braided body for 10,000 minutes at room temperature (approximately 70° F.-72° F.), wherein the "breaking strength" of the braided body equals the denier times (x) the ultimate tensile strength ("UTS"; also referred to herein as tenacity) of the braided body. The UTS of a fiber or of the braided body is the maximum load it can withstand before breaking. When creep is measured at 70° C. with the braided body being subjected to a stress equal to 10% of the breaking strength of the braided body for 300 minutes, the braided body preferably exhibits about 5.0% or less elongation, more preferably about 4.0% or less elongation, and most preferably about 3.0% or less elongation.

When the fibers forming the braided body are multifilament fibers rather than monofilament fibers, as is preferred, the multifilament fibers may optionally be twisted or air entangled prior to braiding. Various methods of twisting fibers are known in the art and any method may be utilized. Useful twisting methods are described, for example, in U.S. Pat. Nos. 2,961,010; 3,434,275; 4,123,893; 4,819,458 and 7,127,879, the disclosures of which are incorporated herein by reference to the extent consistent herewith. In a preferred embodiment, the fibers are twisted to have at least about 0.5 turns of twist per inch of fiber length up to about 15 twists per inch, more preferably from about 3 twists per inch to about 11 twists per inch of fiber length. In an alternate preferred embodiment, the fibers are twisted to have at least 11 twists per inch of fiber length, more preferably from about 11 twists per inch to about 15 twists per inch of fiber length. The standard method for determining twist in twisted fibers is ASTM D1423-02. Similarly, various methods of air entangling multifilament fibers are conventionally known and described, for example, in U.S. Pat. Nos. 3,983,609; 4,125,922; and 4,188,692, the disclosures of which are incorporated by reference herein to the extent consistent herewith. In a preferred embodiment, the multifilament fibers are neither twisted nor air entangled. Also, prior to braiding multiple fibers together to form the braided body, the individual fibers themselves are preferably non-braided.

It has been found that a braided body formed from a plurality of fibers wherein at least one of said fibers forming the braided body comprises an ultrahigh molecular weight polyolefin fiber having a tenacity of at least 39 g/denier, more preferably a tenacity of at least 43 g/denier, most preferably a tenacity of at least 45 g/denier, will have a braided body tenacity of at least 22 g/denier, more preferably at least 23 g/denier and most preferably at least 24 g/denier. The highest tenacities are typically achieved when all or most of the fibers of the braided body comprise ultra high molecular weight polyethylene fibers having tenacities of greater than 39 g/denier, typically at least about 43 g/denier, more typically at least about 45 g/denier. The tenacity of the braided body will be lower than the tenacities of the component fibers because the fibers in the braided body are coiled into a helix and therefore are not fully straight, which inhibits exploitation of the full tensile strength of fibers. Utilizing such high tenacity fibers beneficially produces fishing lines, ropes and other elongate bodies having improved breaking strength and knot strength relative to elongate bodies formed with lower tenacity fibers, particularly fibers having tenacities below 39 g/denier.

The fibers forming these single braided, solid braided or hollow bodies may optionally be fused together according to the techniques described above from U.S. Pat. Nos. 5,540,990; 5,749,214; and 6,148,597, wherein the individual fibers forming the braided body are fused together optionally with the application of heat and tension. When this option is performed, the braided body is optionally subjected to stretching, optionally at an elevated temperature that is within the melting point range of the filament polymer material that is sufficient to at least partially fuse the contact surfaces of the individual filaments forming the fiber into a line having monofilament-like characteristics. Conditions useful for the stretching/surface fusion process include a temperature or series of oven temperatures within the melting point range of the filament polymer that allows for adequate fusion during the exposure period. The temperature is preferably within the range from about 150° C. to about 157° C. for high molecular weight, gel spun polyethylene multifilament fibers exhibiting a relaxed melting point range of from about 138° C. to about 162° C. at a 20° C./minute scan rate. Residence times during which the line is exposed to the fusion temperature are within the range of from about 6 seconds to about 150 seconds. Only the outer surface of the filaments should soften and begin to fuse. During the stretching/surface fusion process, the heated fiber is held under tension that is preferably applied continuously. Preferably, the stretching/surface fusion step is conducted at an overall stretching ratio in one or more stages of stretching of from about 1.01 to about 3.0, and more preferably from about 1.1 to about 1.8.

In one embodiment, the fibers forming the braided bodies are at least partially coated with either a thermoplastic resin or an oil, followed by fusing them together. Suitable thermoplastic resins non-exclusively include polyolefin resins such as polyolefin wax, low density polyethylene, linear low density polyethylene, polyolefin copolymers, ethylene copolymers such as ethylene-acrylic acid copolymer, ethylene-ethyl acrylate copolymer, ethylene-vinyl acetate copolymer, polyisoprene-polystyrene-block copolymers (such as KRATON® D1107 commercially available from Kraton Polymers of Houston, Tex.), polyurethanes, polyvinylidene fluoride, polychlorotetrafluoroethylene (PCTFE), and copolymers and blends of one or more of the foregoing. Suitable polyolefin waxes non-exclusively include ACumist® micronized polyolefin waxes commercially available from Honeywell International Inc. of Morristown, N.J. The most preferred thermoplastic resin will have a lower melting point than the specific polyolefin fiber that is utilized, and is a drawable material, and most preferably is a polyolefin resin. Suitable oils non-exclusively include mineral oils, paraffin oils, and vegetable oils as is conventionally known in the art, such as is described in U.S. Pat. Nos. 5,540,990; 5,749,214; and 6,148,597.

However, in the most preferred embodiments, the fibers forming the braided body are not fused together, i.e. they are unfused. This is distinguished from the method of U.S. Pat. Nos. 5,540,990; 5,749,214; and 6,148,597 where the fibers are fused together. In this regard, the braided body may be stretched or unstretched, although it is preferably stretched, and stretching may be performed with or without heating the fibers/braided body, although heating is preferred. In this regard, stretching of the braided body refers to stretching after braiding the fibers together into the braided body, wherein even in an unstretched braided body, the component fibers forming the braided body are almost always stretched prior to braiding. When it is desired to stretch the braided body with heat but without fusing the component fibers of the braid, fusing is avoided by heating the braided body to a temperature below the melting point of the fibers. For example, when the braided body incorporates ultra high molecular weight, gel spun polyethylene multifilament fibers, this temperature is preferably within the range of from about 145° C. to about 153° C., more preferably from about 148° C. to about 151° C. (highly oriented, ultra high molecular weight polyethylene fibers generally have a higher melting point than bulk UHMW PE or lower molecular weight polyethylenes). During this stretching without fusion process, the fiber is preferably held under tension that is preferably applied continuously. Preferably, the stretching step without fusion is conducted at an overall stretching ratio in one or more stages of stretching of from about 1.01 to about 3.0, and more preferably from about 1.1 to about 1.8, preferably with the application of heat.

The braided bodies provided herein are essentially braided ropes of any diameter including no unbraided fibers or strands. The braided bodies are preferably round, having a round, circular or oval cross section, rather than flat and may be formed using any conventionally known braiding technique as would be determined by one skilled in the art, such as plaiting, single braid, solid braid or hollow braid techniques. They may be formed using conventional braiding equipment and methods. Suitable braiding equipment is commercially available, for example, from Herzog Maschinenfabrik GmbH of Oldenberg, Germany. Preferably, the braided bodies incorporate from 1 to about 12 discrete fibers, more preferably from 1 to 12 discrete fibers, more preferably from 3 to 8, still more preferably from 3 to 6, still more preferably from 3 to 4, still more preferably from 4 to 8 and most preferably from 4 to 6 discrete fibers. However, more than 12 discrete fibers may be incorporated, such as 3-20 or more, 3-30 or more, 3-40 or more, 3-50 or more, or greater than 50 discrete fibers, such as 50-100 discrete fibers. Ropes, for example, may include thousands of discrete fibers, such as from 5000-6000 discrete fibers or more.

While the braided bodies provided herein may be of any diameter, regardless the total number of filaments, fibers or strands in the braided bodies, in the most preferred embodiments herein, the braided bodies most preferably have very small diameters as is desirable for their use as fishing lines. Preferably, the braided bodies have a diameter of 2.0 mm or less, 1.9 mm or less, 1.8 mm or less, 1.7 mm or less, 1.6 mm or less, 1.5 mm or less, 1.4 mm or less, 1.3 mm or less, 1.2 mm or less, 1.1 mm or less, 1.0 mm or less, 0.9 mm or less, 0.8 mm or less, 0.7 mm or less, 0.6 mm or less, 0.5 mm or less, 0.4 mm or less, 0.3 mm or less, or 0.2 mm or less. These diameters are consistent with those of conventional braided fishing lines, but fishing lines as fabricated herein will have superior breaking strength compared to said conventional braided fishing lines at identical diameters.

The diameter of a fiber or the diameter of the braided bodies can be calculated from the fiber denier or braided body denier with the following formula:

$$\text{Diameter} = \sqrt{\frac{\text{Denier}}{9000 \cdot \text{density} \cdot 0.7855}}$$

where density is in grams per cubic centimeter (g/cm³) and the diameter is in mm. In this regard, the term "denier" refers to the unit of linear density equal to the mass in grams per 9000 meters of fiber. The denier of a multifilament fiber is determined by the number of filaments forming the multifilament fiber and the denier of each filament, known as denier per filament ("dpf"). In this regard, a typical, most preferred multifilament fiber will have from about 40 to about 240 individual filaments, so dividing the total fiber denier by the number of filaments gives you the dpf. Ultra high molecular weight polyethylene has a density of 0.97 g/cc, though at very high molecular weights that may increase to from about 0.98 g/cc to about 0.995 g/cc, as would be known by one skilled in the art. The denier of a braided body may also be calculated by adding together the denier of each individual fiber forming the braided body.

Generally, the lower the fiber denier, the smaller the fiber diameter, and it is typical for fibers having greater tenacities to be of a smaller diameter because high tenacity fibers are highly oriented (stretched/drawn) to increase their tenacity. In the preferred embodiments herein, multifilament fibers forming the braided body have a denier of from about 10 to about 800, more preferably from about 20 to about 600, still more preferably from about 30 to about 500, still more preferably from about 30 to about 400 and most preferably from about 30 to about 300, for a multifilament fiber having from about 40 to about 240 total filaments.

The braided body itself incorporating, for example, from 3 to 12 discrete fibers, will have a denier of from about 30 to about 2300, more preferably from about 40 to about 1900, still more preferably from about 1300 to about 1900, still more preferably from about 1000 to about 1800, still more preferably from about 1500 to about 1800 or from about 1200 to about 1750, and most preferably from about 1600 to about 1750. The braid denier will typically be greater than the combined denier of all the component fibers because due to the braid construction, where fibers are turned over each other at the crossover points, i.e. picks, 9000 meters of the braid will incorporate more than 9000 meters of each individual fiber. As noted above, the breaking strength of the braided body equals the denier times the tenacity of the braided body. In preferred embodiments, the braided body has a breaking strength of at least 83.0 pounds force (lbf), more preferably at least 85.0 lbf, and most preferably at least 87.0 lbf for unstretched braided bodies. Commercially available fishing line ratings are often marketed according to their knot strength rather than their breaking strength, and the fishing lines provided herein exhibit superior Palomar knot strength (i.e. strength of a Palomar knot) relative to prior art fishing lines. Palomar knot strength is measured according to conventionally known methods. In the preferred embodiments, the braided bodies have a Palomar knot strength of at least 50 lbf., more preferably at least 52 lbf., still more preferably at least 54 lbf., still more preferably at least 56 lbf., still more preferably at least 58 lbf., and most preferably at least about 60 lbf. or >60 lbf. This is reflected in the samples tested in Example 1 as outlined in Table 1 below. In a most preferred embodiment, a braided body formed exclusively from UHMW PE fibers having fiber tenacities of at least about 43.5 g/denier, wherein the braided body has a denier of at least 1500 (e.g. from 1500 to 1800) and a braid density of from 18 PPI to 19 PPI, has a Palomar knot strength of at least 60 lbf.

The following examples serve to illustrate the invention.

EXAMPLE 1

Five sample braided bodies were formed exclusively from four multifilament UHMW PE fibers, each multifilament fiber having a denier of 375 and a tenacity of 43.5 g/denier. The braided bodies had a solid braid construction and were formed using a commercially available braiding machine (Herzog QU 2/8-100 from Herzog Maschinenfabrik GmbH) with an adjustable gear set that permitted adjustment of the picks per inch along the length of the braid. The five samples were produced at varying braid densities, with one each at 25 PPI, 21 PPI, 19 PPI, 18 PPI and 17 PPI as shown in Table 1. All of the samples were unfused and none were coated with any oil or resin except for the pre-existing spin finish applied during manufacture of the fibers. The braided bodies were also not stretched after braiding. The tenacity and Palomar knot strength were determined for each braided body as shown in Table 1. The tenacity relative to the braid density in picks per inch for each braided body sample is graphically represented in FIG. 1.

EXAMPLE 2 (COMPARATIVE)

Five braided bodies were formed exclusively from four multifilament UHMW PE fibers, each multifilament fiber having a denier of 375 and a tenacity of 37.5 g/denier. The braided bodies had the same solid braid construction as the braided bodies in Example 1 and were formed using the same commercially available braiding machine that permitted adjustment of the picks per inch along the length of the braid. The five samples were produced at varying braid densities, with one each at 25 PPI, 21 PPI, 19 PPI, 18 PPI and 17 PPI as shown in Table 1. All of the samples were unfused, and none were coated with any oil or resin except for the pre-existing spin finish applied during manufacture of the fibers. The braided bodies were also not stretched after braiding. The tenacity and Palomar knot strength were determined for each braided body as shown in Table 1. The tenacity relative to the braid density in picks per inch is graphically represented in FIG. 1.

TABLE 1

| | Tenacity (g/denier) | | Palomar Knot Strength (lbf) | |
|---|---|---|---|---|
| PPI | Braids of 37.5 g/d UHMW PE fibers | Braids of 43.5 g/d UHMW PE fibers | Braids of 37.5 g/d UHMW PE fibers | Braids of 43.5 g/d UHMW PE fibers |
| 17 | 19.2 | 24.0 | 46.16 | 59.39 |
| 18 | 19.0 | 24.4 | 45.02 | 61.01 |
| 19 | 17.6 | 24.5 | 45.46 | 62.23 |
| 21 | 16.8 | 20.9 | 40.08 | 52.88 |
| 25 | 12.9 | 16.2 | 42.26 | 57.58 |

As exemplified by the data in Table 1, braids which are formed exclusively from 43.5 g/denier UHMW PE multifilament fibers unexpectedly increased in tenacity from 17 to 19 picks per inch along the length of the braid, before decreasing once at a density of 21 picks per inch. The braids formed exclusively from 37.5 g/denier UHMW PE multifilament fibers decreased in tenacity as the braid density increased from 17-25 picks per inch, as expected.

EXAMPLE 3

Five additional sample braided bodies were formed, each being formed exclusively from four 375 denier, 43.5 g/denier tenacity UHMW PE fibers with a solid braid construction, unfused and with no any oil or resin coating except for the pre-existing spin finish applied during manufacture of the fibers, and without stretching the braided bodies after braiding. The five samples were produced on a Herzog QU 2/8-100 braiding machine at varying braid densities, with one each at 25 PPI, 21 PPI, 19 PPI, 18 PPI and 16.9 PPI as shown in Table 2. Each braided body was tested for thermal shrinkage % in 2 minutes at 145° C. according to ASTM D4974, as also summarized in Table 2. The thermal shrinkage % of the 16.9 PPI, 18 PPI and 19 PPI samples is graphically represented in FIG. 2.

EXAMPLE 4 (COMPARATIVE)

Five additional sample braided bodies were formed, each being formed exclusively from four 375 denier, 37.5 g/denier tenacity UHMW PE fibers with a solid braid construction, unfused and with no any oil or resin coating except for the pre-existing spin finish applied during manufacture of the fibers, and without stretching the braided bodies after braiding. The five samples were produced on a Herzog QU 2/8-100 braiding machine at varying braid densities, with one each at 25 PPI, 21 PPI, 19 PPI, 18 PPI and 16.9 PPI as shown in Table 2. Each braided body was tested for thermal shrinkage % in 2 minutes at 145° C. according to ASTM D4974, as also summarized in Table 2.

TABLE 2

| | Thermal Shrinkage (%) | |
| --- | --- | --- |
| PPI | Braids of 37.5 g/d UHMW PE fibers | Braids of 43.5 g/d UHMW PE fibers |
| 25 | 2.76 | 2.0 |
| 21 | 2.96 | 2.03 |
| 19 | 2.9 | 2.13 |
| 18 | 2.8 | 1.93 |
| 16.9 | 3.0 | 1.66 |

Figure 2:
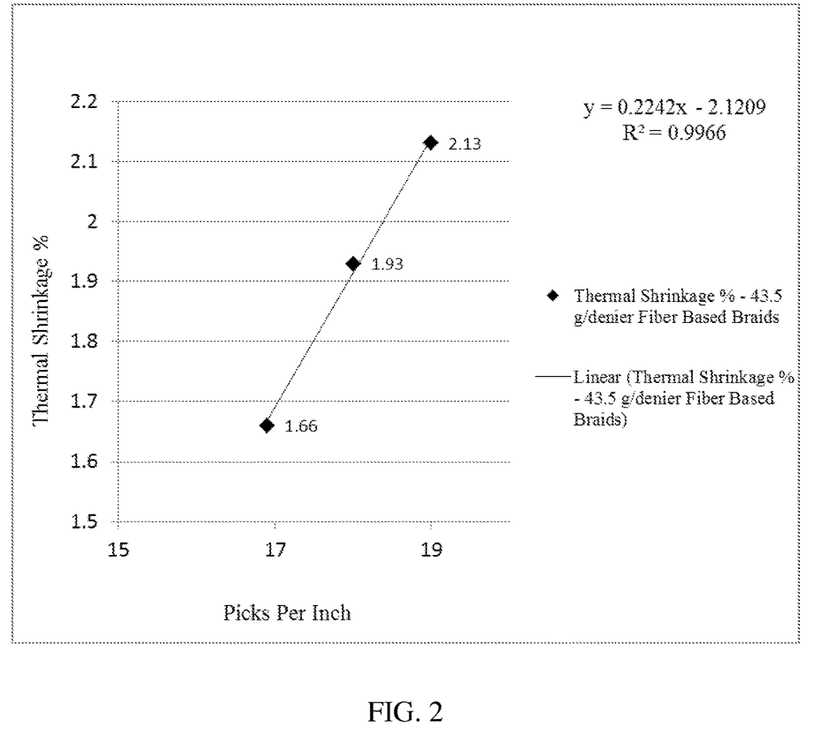
FIG. 2 is a graphical representation of the thermal shrinkage amount in 2 minutes at 145° C. of braided bodies formed exclusively with ultra high molecular weight polyethylene multifilament fibers having tenacities of greater than 39 g/denier.

As exemplified by the data in Table 2, braids which are formed exclusively from 43.5 g/denier UHMW PE multifilament fibers had a substantially lower thermal shrinkage % (all less than 2.15% shrinkage) relative to the braids formed exclusively from 37.5 g/denier UHMW PE multifilament fibers (all greater than 2.75%). As illustrated in FIG. 2, these results for the inventive examples of Example 3 revealed a thermal shrinkage % trend of 0.2242(PPI)-2.209+b, wherein PPI is greater than 15 but less than 20 and wherein b is greater than −0.1 (when tested at 145° C. for 2 minutes).

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A braided body comprising a plurality of ultrahigh molecular weight polyolefin fibers having a tenacity of at least 39 g/denier, wherein all of said fibers forming the braided body are polyolefin fibers, and wherein the braided body has a braid density of less than or equal to 20 picks per inch in length of the braided body, and wherein the tenacity of the braided body increases or remains the same if the braid density is increased from 17 picks per inch in length of the braided body up to 19 picks per inch in length of the braided body.

2. The braided body of claim 1 wherein the braided body has a diameter of 2 mm or less.

3. The braided body of claim 1 wherein the braided body has a breaking strength of at least 83.0 lbs force.

4. The braided body of claim 1 wherein at least one of the fibers forming the braided body comprises a multifilament ultra high molecular weight polyethylene fiber having a tenacity of at least 43 g/denier.

5. The braided body of claim 1 wherein all of the fibers forming the braided body comprise multifilament ultra high molecular weight polyethylene fibers having a tenacity of at least 43 g/denier.

6. The braided body of claim 1 wherein all of the fibers forming the braided body comprise multifilament ultra high molecular weight polyethylene fibers having a tenacity of at least 45 g/denier.

7. The braided body of claim 1 wherein the braided body has a tenacity of at least 22 g/denier.

8. The braided body of claim 1 wherein the fibers forming the braided body are unfused.

9. The braided body of claim 1 wherein the braided body has a braid density of at least about 15 picks per inch in length of the braided body.

10. The braided body of claim 1 wherein the braided body comprises multifilament fibers that are either twisted or air entangled.

11. The braided body of claim 1 wherein the braided body comprises multifilament fibers that are neither twisted nor air entangled.

12. The braided body of claim 1 wherein the braided body has a thermal shrinkage of <2.5% at 145° C. as measured per ASTM D4974, and has an elongation of about 4.0% or less when the braided body is subjected to a continuous stress equal to 10% of the breaking strength of the braided body for 300 minutes at 70° C., and wherein each of the fibers forming the braided body has an intrinsic viscosity of greater than 19 dl/g.

13. The braided body of claim 1 wherein each of the fibers forming the braided body has a denier of from about 30 to about 300.

14. The braided body of claim 1 wherein all of the fibers forming the braided body comprise multifilament ultra high molecular weight polyethylene fibers having a tenacity of at least 43 g/denier, wherein the braided body has a tenacity of at least 22 g/denier, a braid density of at least 15 picks per inch in length of the braided body, a breaking strength of at least 83.0 lbs force, and a diameter of 2 mm or less.

15. A method of making a braided body comprising the steps of:
 a) providing a plurality of polyolefin fibers;
 b) optionally coating at least a portion of each polymeric fiber with either a thermoplastic resin or an oil;
 c) optionally twisting or entangling the fibers; and
 d) braiding the polymeric fibers together to form a braided body having a braid density of less than or equal to 20 picks per inch in length of the braided body; and e) optionally stretching said braided body, wherein the braided body is optionally heated during and/or before stretching to a temperature below the melting point of the fibers; and f) optionally fusing together the fibers forming the braided body, wherein the braided body has a breaking strength of at least 83.0 lbs force and a diameter of less than 2 mm; and wherein all of said fibers forming the braided body are polyolefin fibers.

16. The method of claim 15 wherein all of the fibers forming the braided body comprise multifilament ultra high molecular weight polyethylene fibers having a tenacity of at least 43 g/denier, wherein the braided body has a tenacity of at least 24 g/denier and a braid density of at least 15 picks per inch in length of the braided body, and wherein the fibers forming the braided body are unfused.

17. A braided body formed by the process of claim 15.

18. A braided body comprising a plurality of ultrahigh molecular weight polyolefin fibers, each having a tenacity of at least 39 g/denier, wherein said fibers are braided together and form the braided body, wherein the braided body has a braid density of greater than 15 picks per inch (PPI) but less than 20 PPI in length of the braided body, and wherein the braided body has a diameter of less than 2 mm; and wherein all of said fibers forming the braided body are polyolefin fibers.

19. The braided body of claim 18 wherein the braided body has a breaking strength of at least 83.0 lbf. and a Palomar knot strength of at least 50 lbf., wherein the fibers forming the braided body are unfused.

20. The braided body of claim 18 wherein the braided body has a thermal shrinkage in 2 minutes at 145° C. of 0.2242(PPI)−2.209+b, wherein PPI is greater than 15 but less than 20 and wherein b is greater than −0.1.

* * * * *